July 5, 1960
F. W. VOGES
2,943,464
ALIGNING FLEXIBLE COUPLING
Filed April 9, 1958
2 Sheets-Sheet 2
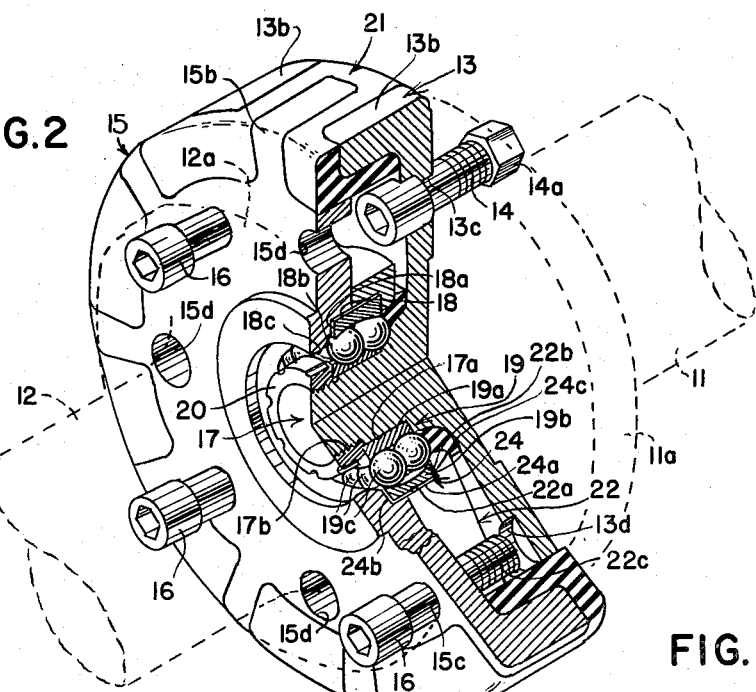
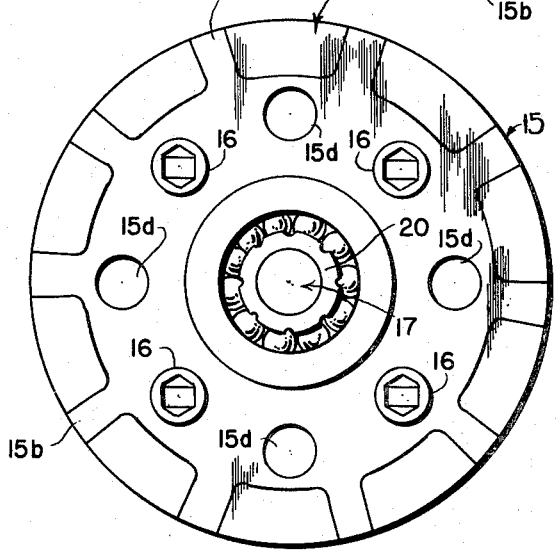
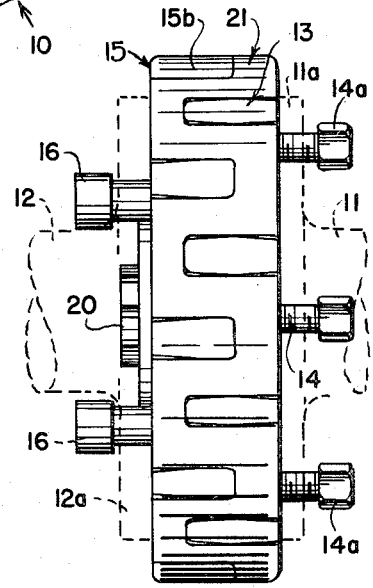
INVENTOR.
Fred W. Voges
by Kane, Dalsimer and Kane
ATTORNEYS United States Patent Office 2,943,464
Patented July 5, 1960

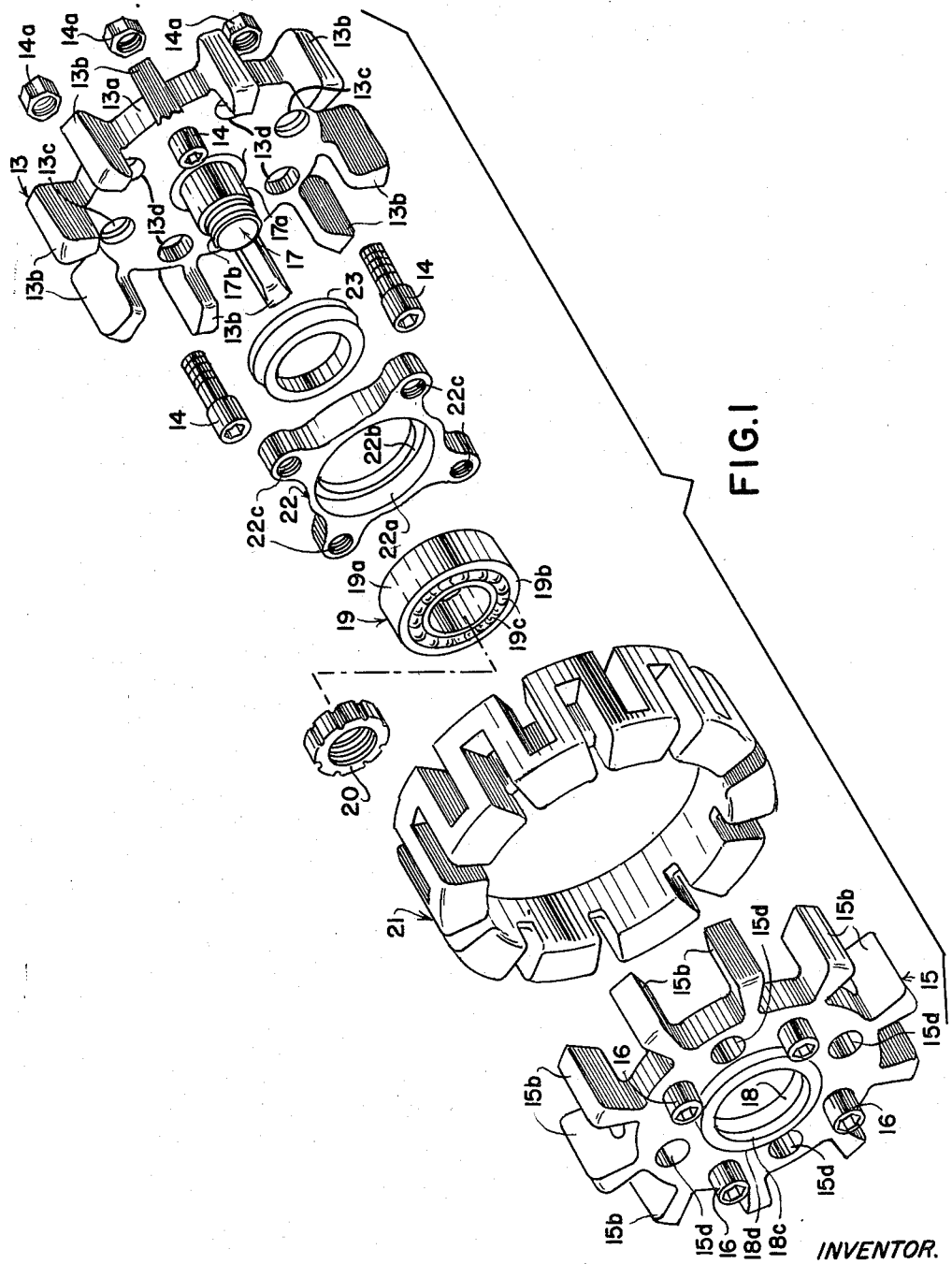

2,943,464

ALIGNING FLEXIBLE COUPLING

Fred W. Voges, 234 N. Woods Road, Flower Hill, Manhasset, N.Y.

Filed Apr. 9, 1958, Ser. No. 727,421

7 Claims. (Cl. 64—14)

This invention relates generally to couplings for connecting one shaft to another and more particularly to those couplings designed for the purpose of connecting a rotary drive shaft to a rotary driven shaft.

It is conventional practice in marine, aeronautical, automotive and industrial mechanics to employ couplings between and at a selected connection location of a driven shaft and driving shaft. At present, as well as in the past, couplings are employed for such purposes and usually result in a substantially permanent connection. When it was desirable or necessary to provide for frequent disassociation of a driven shaft with a drive shaft, a clutch arrangement was preferably utilized to connect these shafts. In any event, flange couplings are the most often used, with the end of the shafts which are to be connected being forged into a flange or, alternatively, with a flange being keyed on and united to the ends of the shafts by bolts. Sections of the selected coupling are then attached to the shaft ends adjacent the flange and the coupling sections subsequently connected one to another to couple the shafts together.

Many problems are encountered in the coupling of one shaft to another and many attempts have been made at solving these various problems. When a shaft has to assume various angular relations, a universal joint type coupling has been proposed. Additionally, the universal type coupling has been applied to compensate for possible misalignment of axes of the shafts. However, this coupling is not designed to take thrust and pull, as for example, that normally encountered in marine applications. In this situation, the driven shaft is a propeller shaft providing thrust for the craft, this thrust being transmitted axially by the driven shaft through the coupling to the driving shaft. Furthermore, it is necessary in a considerable number of applications in different mechanical and technical fields, that a coupling be relatively simple in design, rugged in construction, inexpensive, easy to install and attach to the shafts. Countless applications require that the coupling provide electrical insulation between the driven and driving shafts as well as provision for mechanical isolation in order to protect the shafts from shock and vibration.

The invention herein disclosed has as its principal object the furnishing of a permanent and precisionally held alignment of the juncture of coupled shafts by a special frictionless, self-aligning bearing designed to successfully transmit thrust loads or axial loads as the need suits the application.

Another principal object is to furnish a coupling which is self-aligning and compensates for linear misalignment of the shafts without developing or transmitting stresses and further minimizes undesirable vibration and shock.

Another object of this invention is the provision of a coupling for shafts which will be sufficiently rugged to withstand axial as well as radial forces and which will permit transmission of thrust axially from one coupled shaft to the other.

A further object of this invention is to provide a coupling for rotary shafts which is sufficiently flexible to protect coupled shafts and the equipment attached thereto against shocks such as those due to variations in the driving power or in the loads, thereby mechanically isolating one shaft from the other.

An important object of this invention is to provide a coupling for shafts which will electrically insulate the driving source and the load thereby preventing transmission of detrimental electrical currents.

Another important object of this invention is the provision of a coupling for shafts which is of the sandwich type and which can be utilized in a flange coupling arrangement or attached where there is a split coupling and also one which can be inserted between other types of couplings.

A further important object is the provision of a relatively simple and inexpensive coupling embodying relatively few parts while being rugged in design and permitting versatility in its applications together with ease in its installation.

An aligning flexible coupling embodying the invention and the manner of using the same is described herein with references to the drawings, in which:

Fig. 1 is an exploded perspective view of a coupling including the teachings of the present invention;

Fig. 2 is a perspective view of the assembled coupling with a portion thereof cut away to show more clearly its design and having lengths of a driven and a driving shaft shown in phantom connected therewith;

Fig. 3 is a face view of this coupling; and

Fig. 4 is a side view of this coupling with connected portions of driven and driving shafts shown in phantom.

The self-aligning flexible coupling illustrated in the drawings is designated generally by the numeral 10 and in Figs. 2 and 4 is shown coupling driving shaft 11 to driven shaft 12. A jaw 13 of coupling 10 is attached to flange 11a of shaft 11 by means of a series of threaded bolts 14 and corresponding nuts 14a. Included in coupling 10 is another jaw section 15 which is attached to flange 12a of the driven shaft 12 by means of bolts 16 in a manner to be described subsequently.

Referring now to the details of jaw 13 which is more clearly illustrated in Fig. 1, it will be evident that an integrally fabricated member is most advantageously employed. Accordingly, jaw 13 is formed from any suitable rigid material, as for example, steel, nylon or the like, and includes a circular disc-like body portion 13a. A plurality of jaw teeth 13b which are of substantially rectangular configuration extend radially from the periphery of jaw body 13a at predetermined spaced intervals, and have the terminal free end portions thereof extending axially away from and substantially normal to the plane of either face of jaw body 13a.

A selected number of concentrically located circular holes or openings 13c are provided in jaw body 13a to conveniently receive the necessary amount of threaded bolts 14 to adequately connect coupling 10 to flange 11a of driving shaft 11. Additionally, and for purposes that will become apparent, jaw body 13a may have another series of enlarged holes or openings 13d corresponding to the number of threaded bolts 16. These holes 13d are disposed to be in line with the axis of bolts 16 when the latter are finally set in the coupling 10 to minimize surface-to-surface contact when the coupling 10 is subjected to the normally encountered thrusts and forces or experiences relative displacements of its parts under the contemplated conditions of coupling use. However, a significant purpose for enlarged openings 13d is to permit passage of bolts 16 to the interior of coupling 10 in order that the latter may be connected to flange 12a while working from the exposed face of jaw body 13a.

At the center of disc-like body 13a and integrally extending from one face thereof, is a substantially cylindrical or shaft-like boss 17. This boss 17 presents a substantially cylindrical bearing surface 17a and has a threaded stud 17b at its free end. Furthermore, boss 17 is disposed with respect to jaw teeth 13b so that it extends axially in the same direction as the latter as well as being concentric therewith.

Jaw section 15 in turn is formed usually from substantially the same material as jaw 13, and is comprised of circular disc-like body portion 15a having extending integrally therefrom a plurality of predeterminately spaced jaw teeth 15b which are again of substantially rectangular configuration. These jaw teeth 15b extend radially from the periphery of body 15a and also have free end portions thereof extending axially to be ultimately directed toward jaw 13 and interposed between its jaw teeth 13b in the assembled coupling structure, substantially as shown in Figs. 2 to 4.

A series of holes or openings 15c corresponding in number to the selected number of threaded bolts 16 are formed in jaw body 15a and may be concentrically disposed to permit a secure and adequate connection of the coupling 10 to flange 12a of driven shaft 12. Furthermore, and as provided in jaw 13, a number of enlarged openings or holes 15d may be provided in jaw body 15a opposite the heads of threaded bolts 14 in the assembled coupling to not only insure against undesirable surface contact but to facilitate insertion, tightening and loosening of these threaded bolts 14 when the coupling is assembled through jaw body 15a. This is an extremely important feature when access to the coupling structure from the exposed side face of jaw body 13a is impossible or relatively difficult. Thus, the coupling may be completely assembled and disassembled by manipulating and positioning the various coupling parts while only working at and from one exposed end of the coupling 10, namely, that exposed end presented by jaw body 15a of jaw 15.

An axial bore 18 is provided in jaw body 15a of jaw 15 to receive a ball bearing assembly, as will be described shortly. The inner end of bore 18 terminates in a shoulder 18a which joins with an inwardly beveled surface 18b. A reduced bore 18c extends from beveled surface 18b to the side of jaw body 15a distal the side providing the outer end of bore 18. As will be observed in the drawings, the outer end of bore 18c is formed in a boss 18d extending integrally from jaw body 15a to present a mounting surface for flange 12a of driven shaft 12 and also to house and protect the free end of boss 17 when the coupling structure is assembled.

Double ball bearing 19 is press fitted into bore 18 to abut shoulder 18a in jaw 15 so that inner race 19a of the double ball bearing 19 can conveniently receive bearing surface 17a of jaw 13. Double ball bearing 19 additionally includes an outer race 19b which engages surfaces of bore 18 and shoulder 18a in jaw 15 and bearing balls designated at 19c. Nut 20, which is threadedly mounted upon threads 17b of jaw section 13 functions to maintain the inner bearing race 19a and consequently ball bearing 19 on bearing surface 17a of cylindrical boss 17.

In order to achieve a flexible coupling so that shocks will not be transmitted from one shaft to another through the coupling 10 and further in order to achieve mechanical isolation of the shafts 11 and 12, the jaw teeth 13b and 15b are embraced by a flexible material in the assembled coupling. This flexible material may be formed into a molded structure 21 from rubber to include cavities, the configuration of which is shown in Fig. 1. This flexible mold 21 isolates each tooth 15b from each tooth 13b and avoids metal-to-metal contact. It is preferable to leave the rubber unbonded wth respect to jaw teeth 13b and 15b so that it can shift with respect to the latter, thereby increasing the flexibility of the jaw structure and consequently the entire coupling. A unit is thus achieved that will not swell out or bulge due to high radial loads and centrifugal forces and which lends itself to simple installation and replaceability. The disclosure of mold 21 is in no sense limiting in attaining the desired effects of shock absorption, flexibility and transmittal of loads encountered.

A bearing retainer 22 is employed to secure the bearing outer race 19b and naturally ball bearing 19 to jaw body 15a of jaw 15. This bearing retainer is provided with an enlarged bore 22a terminating inwardly into a shoulder 22b. Threaded or tapped bores 22c are formed adjacent the outer periphery of bearing retainer 22 and are of a sufficient number to threadedly receive the selected amount of threaded bolts 16.

A rubber seal 23 of suitable material and configuration provides a seal between bearing retainer 22 and the juncture between jaw body 13a and boss 17, as clearly illustrated in Fig. 2, and further functions to inhibit possible metal-to-metal contact together with adding additional flexibility to the coupling structure. Additionally, and if a contemplated application necessitates its employment, an electrical insulator 24 may be provided to cover outer race 19b of double ball bearing 19. This electrical insulator 24 can be phenolic impregnated fabric based material possessing compressibility and the desired dielectric and insulating properties. In certain applications it has been preferable to use a $\frac{1}{16}$-inch thick wall 24a to cover the outer surface of the outer race 19b and two washers 24b and 24c, one on each end of the outer race, the washers being $\frac{1}{64}$-inch in thickness.

The use of the electrical insulator 24 together with the rubber mold 21, as well as rubber seal 23 adjacent the torque transmitting surfaces, completely insulates jaw 15 and jaw 13 electrically as well as isolating them mechanically, thereby preventing conduction of electrical current from shaft 12 to shaft 11. This is extremely important in many applications, especially in marine technology. The use of the electrical insulator 24 prevents electrolysis between the engine shaft and the propeller of vessels where the coupling would be located and utilized to connect an engine shaft or driving shaft 11 to a propellor shaft or driven shaft 12.

In order to couple shaft 12 to shaft 11 by means of the aligning flexible coupling which is described herein, when the flexible coupling is fully assembled the flange 11a of shaft 11 is provided with circle of openings adapted to align with openings 13c in jaw 13. Bolts 14 may then be passed through the openings 15d in jaw section 15 and inserted in openings 13c in jaw section 13. The threaded terminal ends of bolts 14 are positioned in the openings of flange 11a and screwed into threaded openings of bolts 14a. The openings 15d are obviously of sufficient diameter that only the head of bolts 14 can pass therethrough. The coupling 10 is now firmly attached to flange 11a of shaft 11.

Bolts 16 may then be passed through openings in flange 12a arranged in a circle to align with openings 15c of jaw body 15a and screwed into threaded bores 22c in bearing retainer 22 so that shaft 12 is ultimately coupled to shaft 11 by means of coupling 10.

The pair of jaws 13 and 15 pull the shafts 11 and 12 together and the coupling 10 permits the axis of rotation of the shafts to become aligned to at least intersect at a single point if they are not superimposed. Accordingly, as the shafts rotate and if they are slightly misaligned, the centers thereof where they are coupled together are at substantially the same point. The double ball bearing 19 will function, during the rotation of the shafts to self-align the axis of rotation of each shaft so that a point of intersection of the axis is maintained, thereby minimizing torque that may develop as a result of shaft misalignment. The balls take thrust and pull but do not experience rotation, so that the transmission of thrust and pull can be accomplished axially from one shaft to another. This is especially necessary in marine work where there is a reverse and forward motion as well as thrust developed by a vessel's propeller which is transmitted axially from one shaft to another. This ball and socket type joint could be replaced by a spherical bearing which would similarly act like a ball and socket joint and swivel to keep the aforementioned points of the shafts in alignment. As will be more clearly observed in Fig. 4, jaw teeth 13b and 15b are provided with slightly contoured or arcuated side faces, which configuration has been found to appreciably aid in the transmission of radial loads while the coupled shafts are in a misaligned position.

The coupling of the present invention is of the sandwich or pancake type and can be installed in an assembled condition; however, it can be used for other types of coupling arrangements and is not limited to installation as an assembly. Additionally this coupling can be used with split couplings.

It will be evident that the many problems encountered in the coupling of one shaft to another are effectively obviated. The present aligning coupling overcomes the problem of angular misalignment of shafts by employing the use of the principles of the self-aligning bearing. This principle assures a common origin for the center lines of shafts being coupled. It is believed that a common origin is necessary in order to properly and uniformly transmit radial loads, which, in effect, will eliminate vibration. Accordingly, any bearings adapted to produce the desired end results are contemplated by this invention and the disclosure of double ball bearings and ball bearings is in no sense intended to be limiting but submitted for purposes of a detailed description. In this connection, and to insure positive built-in permanent shaft alignment, thereby precisely maintaining a point of juncture between shafts and thus eliminating driven shaft runout, another somewhat preferred shaft centering means may be employed. This centering means is composed of an inner race which is made up of a single continuous row of ball bearings which need not be caged. This permits the use of approximately one-third more balls which thus will be able to transmit greater thrust load than a self-aligning double row bearing. The outer race naturally will have a spherical concave inner surface as in the self-aligning double row bearing. In this manner, this invention achieves point contact which greatly reduces friction and therefore attains free central movement along with the successful transmittal of thrust loads through the bearing.

The aligning flexible coupling is additionally designed to be of sufficient strength to compensate for linear misalignment without inducing stresses. Of extreme importance is the design and development of the subject aligning coupling for advantageous use in marine applications where the propeller shaft provides the thrust and reverse for a craft. The aligning flexible coupling of this invention is effectively designed to transmit this thrust through the coupling to the drive shaft. Further, the aligning flexible coupling is of sufficient strength and flexibility in order to protect the coupled shafts and the equipment attached thereto against shocks such as those due to variations in driving power or by induced load variations. In this connection, the coupling is designed to, in effect, mechanically isolate one shaft from the other.

Additionally, the present aligning flexible coupling deletes any possibility of electrical shock by employing the use of a dielectric material which functions to electrically isolate the driven half of the coupling from the driving half. Another important feature that should be mentioned at this time is the fact that this electrical insulator will also stop any galvanic action in marine applications. Furthermore, the flexible aligning coupling offers a unique and simple method of installation. This method fastens both shaft flanges from one common side, which in numerous situations is of the utmost importance. The coupling is designed for sandwich-type installation, which can be utilized in a flange coupling arrangement or conveniently attached where there is a split coupling and also properly inserted between other types of couplings. The incorporation of the many hereinbefore mentioned features into a single coupling structure according to the teachings of the instant invention renders this coupling extremely versatile, in that it can be readily adaptable for marine, aeronautical, automotive and industrial applications.

Thus, among others, the several objects in the invention as specifically aforenoted, are achieved. Obviously, numerous changes in constructions and rearrangements of the parts might be resorted to without departing from the spirit of the invention as defined by the claims.

I claim:

1. An aligning flexible pancake-type coupling for a driven shaft and a driving shaft comprising in combination: a first jaw for connection with a driven shaft; a second jaw adjacent said first jaw for connection with a driving shaft; each of said jaws including a substantially circular disc-shaped body portion having opposed side faces and a plurality of spaced longitudinally extending teeth, said teeth of each jaw being integral radial extensions of the companion body portion, each tooth of one jaw being interposed between and spaced from a pair of teeth of the other jaw, each of said teeth having an outer face, an inner face, opposed side faces, a first end face substantially flush with one side face of its mounting body portion and another end face projecting beyond the opposed side face of its mounting body portion, and said first end face of each of said teeth of said one jaw being substantially coplanar and parallel to the first end face of each of said teeth of said other jaw; and an integral mold of resilient material, said mold having portions thereof interposed between opposed side faces of adjacent teeth to mechanically isolate the teeth of one jaw from those of the other, said mold having portions embracing the inner face of the teeth of each jaw for limiting radial outward movement of said mold, said mold having portions embracing the inner face of each jaw and said another end face to respectively mechanically isolate the teeth of one jaw from the body portion of the other jaw and the body portions from one another whereby optimum torque transmission is obtained by said coupling, and said mold being interposed between the planes of said first end face of both jaws.

2. An aligning flexible coupling for a driven shaft and a driving shaft comprising in combination: a first jaw for connection with a driven shaft; a second jaw adjacent said first jaw for connection with a driving shaft; each of said jaws including a substantially circular disc-shaped body portion and a plurality of spaced longitudinally extending teeth, said teeth of each jaw being integral radial extensions of the companion body portion, each tooth of one jaw being interposed between and spaced from a pair of teeth of the other jaw; an integral mold of resilient material interposed between opposed faces of said teeth and being so constructed and arranged to mechanically isolate said jaws; and bearing means interposed between and coupled with both of said jaws and being so constructed and arranged to minimize torques developed in said coupling by providing a substantially common origin for the axes of the shafts to be coupled.

3. The invention in accordance with claim 2 wherein said bearing means comprises a ball bearing secured to each of said jaws.

4. A coupling for shafts comprising in combination: a pair of jaws each having spaced longitudinally extending teeth, each tooth of one jaw being interposed between a pair of teeth of the other jaw; resilient material interposed between opposed faces of said teeth and being so constructed and arranged to mechanically isolate said jaws; and a ball bearing secured to each of said jaws and being so constructed and arranged to minimize torques developed in said coupling; and electrical insulating means interposed between said ball bearing and one of said jaws to electrically isolate said jaws.

5. A coupling for shafts comprising in combination: a pair of jaws each having spaced longitudinally extending teeth, each tooth of one jaw being interposed between a pair of teeth of the other jaw; resilient material interposed between opposed faces of said teeth and being so constructed and arranged to mechanically isolate said jaws; and a ball bearing secured to each of said jaws and being so constructed and arranged to minimize torques developed in said coupling; and a plurality of openings extending through said jaws for facilitating the connection of said coupling to said shafts through either of said jaws.

6. An aligning flexible coupling for a driven shaft and a driving shaft comprising in combination: a first jaw for connection with a driven shaft; a second jaw adjacent said first jaw for connection with a driving shaft; a resilient material interposed between said jaws and being so constructed and arranged to mechanically isolate said jaws; bearing means interposed between and coupled with both of said jaws and being so constructed and arranged to minimize torques developed in said coupling by providing a substantially common origin for the axes of the shafts to be coupled; and electrical insulating means interposed between said bearing means and one of said jaws to electrically isolate said jaws.

7. An aligning flexible coupling for a driven shaft and a driving shaft comprising in combination: a first jaw for connection with a driven shaft; a second jaw adjacent said first jaw for connection with a driving shaft; a resilient material interposed between said jaws and being so constructed and arranged to mechanically isolate said jaws; and bearing means interposed between and coupled with both of said jaws and being so constructed and arranged to minimize torques developed in said coupling by providing a substantially common origin for the axes of the shafts to be coupled; and a plurality of openings extending through said jaws for faciliating the connection of said coupling to said shafts through either of said jaws.

References Cited in the file of this patent

UNITED STATES PATENTS

| | | |
|---|---|---|
| 1,561,476 | Masury et al. | Nov. 17, 1925 |
| 1,780,727 | Tenney | Nov. 4, 1930 |
| 2,200,641 | Ricefield | May 14, 1940 |
| 2,537,847 | Neher | Jan. 9, 1951 |
| 2,620,640 | Bales | Dec. 9, 1952 |
| 2,716,334 | Scott et al. | Aug. 30, 1955 |